(12) United States Patent
Goenawan et al.

(10) Patent No.: US 12,417,162 B2
(45) Date of Patent: Sep. 16, 2025

(54) ADAPTATION(S) BASED ON CORRELATING HAZARDOUS VEHICLE EVENTS WITH APPLICATION FEATURE(S)

(71) Applicant: GOOGLE LLC, Mountain View, CA (US)

(72) Inventors: Effie Goenawan, San Francisco, CA (US); Austin Chang, San Francisco, CA (US); James Stephen Higgins, San Jose, CA (US); David Black, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/385,187

(22) Filed: Oct. 30, 2023

(65) Prior Publication Data

US 2024/0059149 A1 Feb. 22, 2024

Related U.S. Application Data

(63) Continuation of application No. 17/165,795, filed on Feb. 2, 2021, now Pat. No. 11,801,750.

(51) Int. Cl.
*B60K 35/00* (2024.01)
*G01C 21/34* (2006.01)
(Continued)

(52) U.S. Cl.
CPC .......... *B60K 35/00* (2013.01); *G01C 21/3484* (2013.01); *G01C 21/3664* (2013.01); *G06F 3/0481* (2013.01); *G06F 3/04842* (2013.01);
*G06F 3/167* (2013.01); *G06F 11/302* (2013.01); *G06F 11/3438* (2013.01);
(Continued)

(58) Field of Classification Search
CPC ........ B60K 35/00; B60K 35/28; B60K 35/26; B60K 2360/166; B60K 2360/167; B60K 35/10; G06F 40/40; G06F 3/0481; G06F 3/04842; G06F 3/167; G06F 11/302;
(Continued)

(56) References Cited

U.S. PATENT DOCUMENTS 9,113,306 B2   8/2015 Jackson et al.
2014/0195272 A1*  7/2014 Sadiq .................... G06Q 40/08
                                                                705/4

(Continued)

*Primary Examiner* — David E Choi
(74) *Attorney, Agent, or Firm* — Gray Ice Higdon

(57) ABSTRACT

Methods and apparatus for detecting hazardous vehicle events and encouraging usage of driving optimized application features to mitigate occurrence of the hazardous vehicle events. The driving optimized application features can address unsafe driving events that are determined to be correlated with certain distracting application features. For example, an application of a computing device can determine that a user is occupying a vehicle and is driving toward a destination. While driving, data available to the application can indicate that an unsafe driving event, such as a hard braking event, has occurred while the user was interacting with another application. Thereafter, and based on this data, the application can render an output characterizing the correlation between the hard braking event and the other application, and/or provide the user with an option to interact with the other application via driving optimized feature(s).

20 Claims, 8 Drawing Sheets

(51) Int. Cl.

| | |
|---|---|
| *G01C 21/36* | (2006.01) |
| *G06F 3/0481* | (2022.01) |
| *G06F 3/04842* | (2022.01) |
| *G06F 3/16* | (2006.01) |
| *G06F 11/30* | (2006.01) |
| *G06F 11/34* | (2006.01) |
| *G06F 40/40* | (2020.01) |
| *G10L 15/22* | (2006.01) |
| *B60K 35/10* | (2024.01) |
| *B60K 35/26* | (2024.01) |
| *B60K 35/28* | (2024.01) |

(52) U.S. Cl.
CPC .............. *G06F 40/40* (2020.01); *G10L 15/22* (2013.01); *B60K 35/10* (2024.01); *B60K 35/26* (2024.01); *B60K 35/28* (2024.01); *B60K 2360/166* (2024.01); *B60K 2360/167* (2024.01); *G10L 2015/223* (2013.01)

(58) Field of Classification Search
CPC ............ G06F 11/3438; G01C 21/3484; G01C 21/3664; G10L 15/22; G10L 2015/223
See application file for complete search history.

(56) References Cited

U.S. PATENT DOCUMENTS

| | | | |
|---|---|---|---|
| 2018/0274927 A1* | 9/2018 | Epperlein | G01C 21/20 |
| 2018/0365913 A1* | 12/2018 | Nix | B60K 35/22 |
| 2019/0027038 A1* | 1/2019 | Chintakindi | B60W 30/09 |
| 2020/0057894 A1* | 2/2020 | Sambo | G06T 7/20 |
| 2020/0122743 A1* | 4/2020 | Badigannavar | G08G 1/147 |
| 2020/0128373 A1* | 4/2020 | Stevens | G06F 9/542 |
| 2020/0130707 A1* | 4/2020 | Sonntag | G01C 21/3453 |
| 2020/0319635 A1* | 10/2020 | Andres | G05D 1/0212 |
| 2021/0053418 A1* | 2/2021 | Kale | G06N 3/049 |
| 2021/0055907 A1* | 2/2021 | Bielby | G06F 3/165 |
| 2021/0237645 A1* | 8/2021 | Farrell | B60W 50/14 |
| 2022/0242233 A1 | 8/2022 | Goenawan et al. | |
| 2023/0024247 A1* | 1/2023 | Ezaki | G06F 3/04817 |
| 2023/0054889 A1* | 2/2023 | Katzir | G08G 1/096775 |

* cited by examiner

ADAPTATION(S) BASED ON CORRELATING HAZARDOUS VEHICLE EVENTS WITH APPLICATION FEATURE(S)

BACKGROUND

Smartphone usage in vehicles can result in accidents in situations where drivers are overly distracted by such usage. In order to mitigate the risk of accidents, application developers and hardware companies have developed various vehicle-optimized applications and/or devices. However, as with many safety features, users may be apprehensive about adopting a vehicle-optimized version of an application feature. Additionally or alternatively, some honest attempts at creating vehicle-optimized applications and/or devices that mitigate the risk of accidents may, in actuality, result in a greater risk.

Further, individual users can be ineffective at gauging whether particular application feature(s) actually mitigate the risk of accidents. For example, a user that drives to work every day may not recall how safely they drove on any particular day in the past, which application(s) they interacted with when driving, and/or how they interacted with such application(s). Therefore, certain dangerous maneuvers, such as hard braking events, quick lane adjustments, and/or other maneuvers made by a distracted driver, may not be acknowledged on any consistent basis by the user because of the driving habits of the user. Furthermore, the user may not always deduce that one or more application features are sources of distraction that have caused the user to make certain unsafe maneuvers or otherwise be involved in unsafe situations.

SUMMARY

Some implementations set forth herein relate to driving-optimized application features (also referred to herein as "application driving features") that are suggested to a user based on determined correlations between certain events and certain application features. The certain application features can be non-driving-optimized application features that are counterparts to the driving-optimized application features. The events can include, but are not limited to, hard-braking events, swerving events, collisions, and/or other vehicle events and/or non-vehicle events that can risk the well-being of a user, another person, and/or a vehicle. In some implementations, a non-vehicle event can be an instance where a driver is distracted, drowsy, impaired, and/or otherwise where the user is in a situation that may harm themselves, another person, and/or property. In some implementations, a vehicle event can be detected using one or more sensors that are incorporated within a computing device (e.g., a smartphone) and/or in communication with the computing device. For example, when the user is located in a vehicle and is navigating the vehicle to a destination, the user may cause a hard-braking event to occur in response to identifying a road hazard. In some implementations, a device and/or an application can determine, based on the sensor data and other application data, that the vehicle event occurred within a threshold period of time of the user accessing a particular application feature of an application. Thereafter, this determination can be used to suggest one or more alternate application driving features and/or driving behavior (e.g., slower speed, additional braking, etc.) to the user, in order to reduce the likelihood that the user will experience such vehicle events in the future. In some implementations, the particular application feature can be disabled in response to determining that a user is utilizing, or will utilize, the particular application feature and, optionally, the alternative application driving feature(s) and/or driving behavior can be suggested and/or remain enabled for the user while the particular application feature is disabled.

In some implementations, an application feature can be considered non-driving-optimized based on having one or more characteristic(s) and/or based on having at least a threshold degree of correlation with potentially dangerous driving event(s). The characteristic(s) can include being less than a certain size, including more than a certain quantity of character(s), word(s), graphical element(s) and/or other feature(s), and/or being of a certain input modality (e.g., typing or touch-based). In some implementations, an application feature can be considered driving-optimized based on having one or more other characteristic(s) and/or based on having less than the threshold degree of correlation with potentially dangerous driving events. The certain other characteristic(s) can include being greater than a certain size, including fewer than a certain quantity of character(s), word(s), graphical element(s) and/or other feature(s), and/or being of a certain other input modality (e.g., voice-based).

In some implementations, vehicle event data can be generated based on multiple prior instances in which vehicle events, such as hard-braking events, were experienced by users who were accessing a non-driving optimized feature of an application. The application can be, for example, a newly released application that may offer features that most users have not interacted with. As a result, predicting a tendency of a particular user to be distracted by the application may be relatively difficult without more data. However, over time, a computing device that has the application installed and/or a separate application (e.g., an automated assistant) can determine whether a user is accessing the application while they are driving. Furthermore, the computing device and/or separate application can determine whether the user experienced a vehicle event within a threshold amount of time (e.g., during or within 5 seconds or other temporal range) of accessing the application and/or a particular feature of the application. Vehicle event data can be generated to characterize a correlation between the vehicle events and the application, in order that other users of the application can be put on notice about the correlation and risks that may come with using the application while driving.

For example, in some implementations, a personal computing device of a user (e.g., a smartphone) and/or a vehicle computing device can provide application data and/or vehicle data that can be used to determine whether the user is accessing an application feature that is not optimized for driving, or predict whether the user will access the application feature that is not optimized for driving. In some implementations, a vehicle computing device can provide vehicle data, with prior permission from the user, for determining whether the user is performing, or is predicted to perform, certain unsafe driving maneuvers. The computing device or a separate computing device can process the application data in order to determine whether to suggest an application driving feature to the user, promote certain statistics about vehicle events associated with the application feature, suggest certain driving behavior, and/or disable the application feature.

For example, a user who is predicted to access the application feature while riding in a vehicle can be presented with an audible suggestion and/or a selectable suggestion at an interface of their personal computing device and/or an interface of a vehicle computing device. In response to selecting the selectable suggestion (e.g., a voice-based selection or a tap via a graphical interface), the user can be provided access to an application driving feature for controlling the application in a manner that reduces a likelihood of the user experiencing a hazardous vehicle event. Additionally or alternatively, the non-driving-optimized application feature can be disabled. In these and other manners, the user can avoid experiencing the vehicle events that the other users experienced when interacting with the application, thereby preserving the safety of the user when they are riding in the vehicle. Further, the user is educated as to driving-optimized feature(s) and their safety benefits, increasing the likelihood that the user will adapt such driving-optimized feature(s) in lieu of their less safe counterpart(s).

In some implementations, users can be presented with data that indicates a correlation between their usage of certain application features and/or application driving features, and vehicle events such as hard-braking events, collisions, and/or other maneuvers that may pose a risk to the safety of a user and other persons, and may have other related impacts. For example, a user that has not fully adopted a habit of using driving-optimized application features can be presented with vehicle event data that characterizes a correlation between certain vehicle events detected by their personal computing device (e.g., a smart phone) and certain application features. In this way, the presentation that is based on objective data can encourage the user to access driving-optimized application features when they are in a vehicle, instead of relying on other application features that may risk their safety. As another example, a user that has at least partially adopted a habit of using driving-optimized application features can be presented with vehicle event data that characterizes a correlation between certain vehicle events (if any) detected by their personal computing device and certain driving-optimized application features. In some of those implementations, the presentation can compare the correlation between the vehicle events and the certain driving-optimized application features to an alternate correlation between the vehicle events and the certain (non-driving-optimized) application features. In this way, the user can be encouraged to continue and/or increase utilization of driving-optimized application features through realization of their safety benefits relative to the certain application features.

In some implementations, when a user is riding in a vehicle and is driving towards a destination, a computing device of the user can determine whether the user is expected to access an application feature of an application that may not be optimized for use in a vehicle. This determination can be based on vehicle event data that characterizes prior instances in which a hazardous vehicle event was experienced by the user and/or another user while the user or other user was accessing the application feature. For instance, when the user has a routine of accessing an email application of their computing device while riding in their vehicle to work, the user can be expected to access the email application during any instances when the user is riding to work. Therefore, when the user is riding to work on a subsequent occasion, and the email application is associated with hazardous vehicle events, the computing device can provide the user with a suggestion for the user to access an application driving feature associated with the email application. For example, when the suggestion corresponds to initializing a driving mode, the user can select a selectable suggestion element associated with the suggestion in order to interact with an application driving feature of the email application.

In some implementations, data can be generated to indicate whether a particular user is adopting a habit of using application driving features and indicate whether the user is experiencing less vehicle events as a result of adopting this habit. This data can be accessed by, for example, an automotive manufacturer and/or any other auto-related entity, with prior permission from the user, in order to make decisions based on the data. For example, a user that has adopted a habit of using an application driving feature that has successfully reduced a number of hazardous vehicle events the user has experienced can receive benefits from the automotive manufacturer and/or other auto-related entity. Alternatively, or additionally, the data can be used to modify features of a vehicle, vehicle computing device, a personal computing device, and/or application in order to reduce a likelihood of users experiencing hazardous vehicle events.

In some implementations, the data can be generated for a variety of different users and used, with prior permission from the users, by one or more applications to make decisions about how to provide a separate user with notifications. Such implementations can be useful for a parent who would like to ensure that their child is adopting safe driving habits. Alternatively, or additionally, an application and/or computing device can access aggregated data that is based on a variety of different device-interaction habits of users when they are driving. In some implementations, the data can be used to characterize whether a geographic area includes drivers that use driving-optimized features of their respective devices and/or applications. Thereafter, when a particular user travels toward and/or in the particular geographic area, an application and/or computing device associated with the particular user can adjust notification settings and/or a driving mode of the application and/or computing device accordingly. In some implementations, a user can make modifications to settings and/or interfaces for providing notifications to the user. For example, a parent can adjust settings of an application in order to receive certain notifications regarding driving habits of their child (e.g., when a particular speed is achieved) and/or in order to automatically control certain application driving features based on the settings and/or driving habits.

For example, in response to determining a particular geographic area corresponds to an area with a threshold percentage of drivers who do not access driving-optimized features of their computing devices while driving (e.g., as determined based on aggregate vehicle event data for the geographic area), a computing device associated with a user who is driving toward or in the particular geographic area can activate a driving mode and/or driving optimized feature(s). In some implementations, when the user is driving toward the particular geographic area, a computing device and/or an application associated with the user can limit, based on the aggregated data, certain notifications from being provided to the user while the user is driving toward and/or in the particular geographic area. For instance, when the user is driving in the particular geographic area, a driving-optimized feature of their computing device can be activated in order that the user will not receive visual notifications, and/or receive audible notifications regarding text messages and/or voice calls. In these and other manners, the notification settings of an application and/or computing device can be dynamically adapted in dependence on the geographic area.

For some additional particular examples, assume a first geographic area where aggregate historical vehicle event data indicates a first rate of vehicle events and a second geographic region where aggregate historical vehicle event data indicates a second rate of vehicle events, where the second rate is lesser (e.g., half of, a third of, one-tenth of) than the first rate. Further assume a user is navigating a vehicle and has a smartphone mounted in the vehicle. Based on the differing rates, driving-optimized application feature(s) can be suggested if the vehicle is navigating in the first geographic area, but not if it is navigating in the second geographic area. Additionally or alternatively, and based on the differing rates, non-driving-optimized application feature(s) can be disabled if the vehicle is navigating in the first geographic area, but not if it is navigating in the second geographic area. Additionally or alternatively, and based on the differing rates, when the user is accessing, via their smartphone, an application that has certain characteristic(s), all or aspects of that application can be disabled and/or driving-optimized feature(s) can be suggested if the vehicle is navigating in the first geographic area. However, all or aspects of that application cannot be disabled and/or driving-optimized feature(s) not suggested if the vehicle is navigating in the second geographic area. For instance, the characteristic(s) of the application can include size of presented text, a quantity of word(s) and/or character(s) in the presented text, a quantity and/or size of other graphical element(s), and/or other features. Further, all or aspects of that application can be disabled and/or driving-optimized feature(s) can be suggested in the first area based on one or more of the characteristic(s) satisfying corresponding first threshold(s) determined based on the first rate, but not disabled in the second geographic area based on one or more of the characteristic(s) not satisfying corresponding more lenient second threshold(s) determined based on the second rate. In these and other manners, whether proactive intervention(s) for increasing driving safety are made, an extent of those intervention(s), and/or the threshold(s) for triggering those intervention(s), can vary dynamically in dependence on vehicle event data for the geographic area in which vehicle navigation is occurring.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s)(TPU(s))) to perform a method such as one or more of the methods described herein. Yet other implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
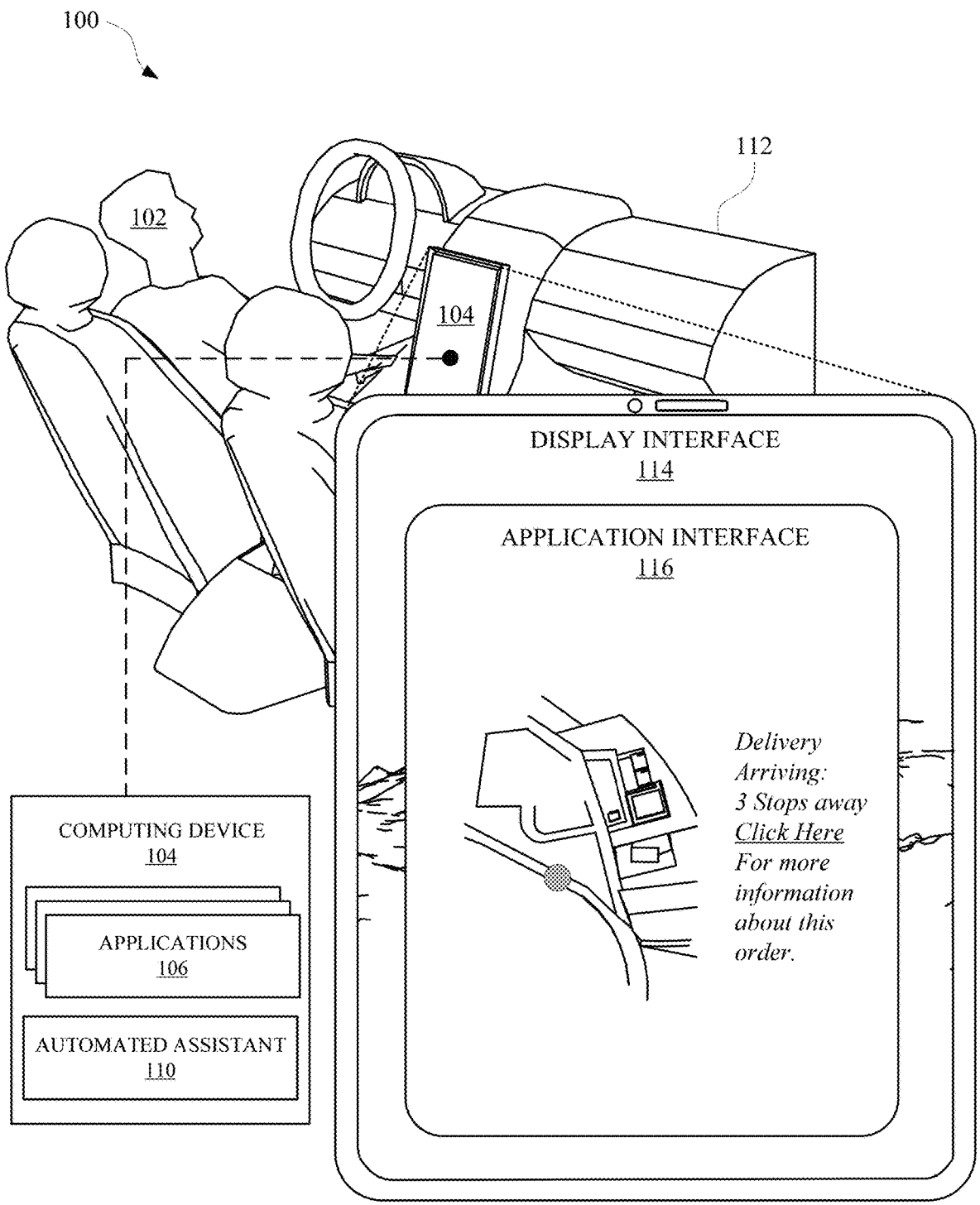
FIG. 1A, FIG. 1B, and FIG. 1C illustrate views of vehicle event data being generated based on a user interacting with an application while in a vehicle.
Figure 1B:
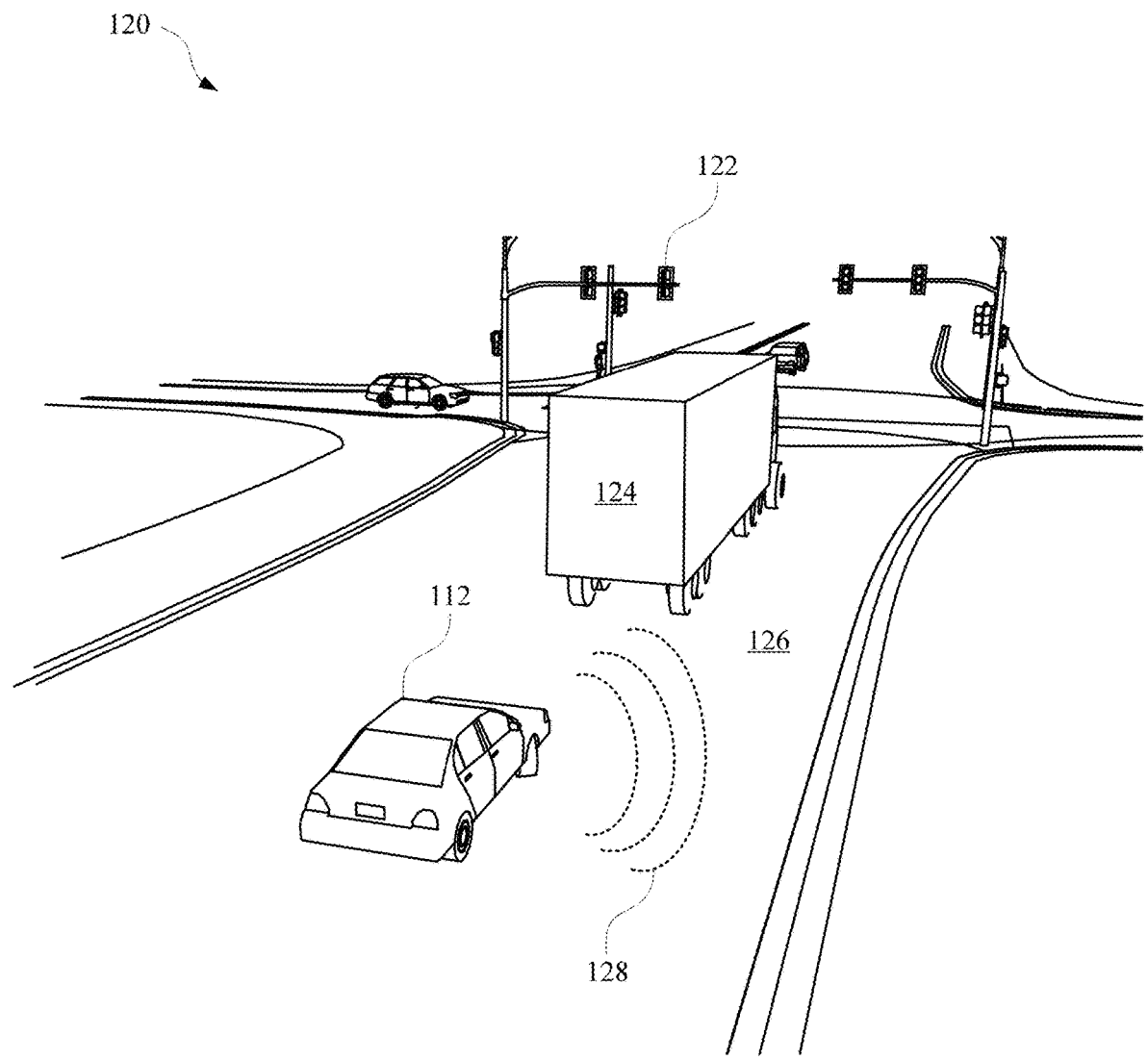
Figure 1C:
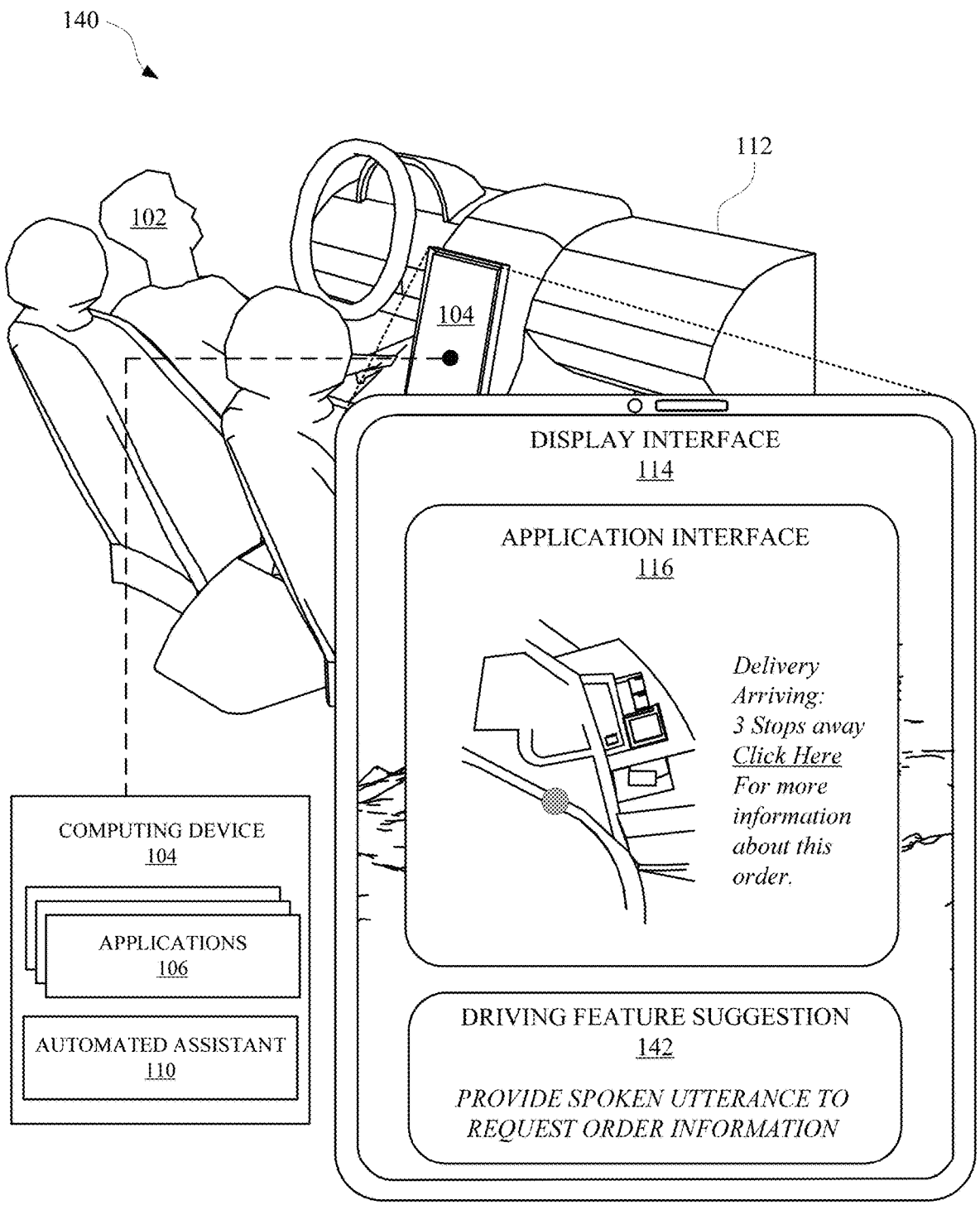

FIG. 1A, FIG. 1B, and FIG. 1C illustrate a view 100, a view 120, and a view 140 of vehicle event data being generated based on a user 102 interacting with an application 106 while in a vehicle 112. The vehicle event data can be generated in order to identify correlations between application usage and vehicle events that may be hazardous to persons and/or property. The user 102 may experience a vehicle event when they are riding in their vehicle 112 while accessing an application 106 via a computing device 104, which can be detachable from the vehicle 112 (e.g., a smartphone) and/or integral to a body of the vehicle 112. For example, the user 102 can interact with the computing device 104 during the drive by providing one or more inputs to a display interface 114 of the computing device 104 within a period of time. During this time, the user 102 can also experience a vehicle event that can be detected via one or more sensors of the computing device 104 and/or a separate computing device.

The user 102 can provide the one or more inputs in order to access an application interface 116 of an application 106 such as, but not limited to, a shopping application. The user 102 can access the application interface 116 of the shopping application in order to determine a status of a shipment. When the user 102 accesses the application interface 116, the application interface 116 can provide one or more graphical elements such as natural language content, selectable elements, pictures, video, and/or any other content that can be rendered at a display interface 114.

In some implementations, the application 106 may not be optimized for driving and/or may not include a driving mode. For example, the application 106 may not be able to determine whether the user 102 is in a vehicle that is moving and/or may not have a setting for controlling the application 106 in a driving mode. Regardless, the user 102 may have options for using application driving features of the computing device 104 and/or a separate application 106 in order to safely control the application 106 while riding in the vehicle 112. For example, the computing device 104 can provide access to an automated assistant 110, which can interface with the application 106 in response to a spoken utterance from the user 102. However, the user 102 may not be aware of these application driving features that can be used to safely control the application 106 while the user 102 is driving.

In some implementations, in order to indicate to the user 102 that they should adopt safer driving habits, vehicle event data can be generated in order to characterize correlations between hazardous vehicle events and user interactions with the application 106. For example, the user 102 can tap on a link (e.g., "Click Here") provided in the application interface 116 within a threshold period of time of a vehicle event 128, as provided in view 120 of FIG. 1B. The vehicle event can be, for example, a hard-braking event that occurred as a result of the user 102 stepping on their brake pedal in order to avoid a collision with a truck 124 that is stopped on a road 126 near a stoplight 122. The vehicle event 128 can be detected by a gyro sensor, an accelerometer, a GPS module, and/or one or more other sensors of the computing device 104 and/or a separate computing device (e.g., a vehicle computing device that is in communication with the computing device 104).

In some implementations, vehicle event data can be generated by the computing device 104, the automated assistant 110, and/or a separate device or application. The computing device 104 can determine that the vehicle event 128 occurred within a threshold period of time of the user 102 interacting with the application 106 and/or computing device 104. For example, the vehicle event data can characterize an instance in which the user 102 accessed a video within a threshold period of time of the vehicle event 128 occurring. Alternatively, or additionally, the vehicle event data can characterize an instance in which the user 102 was provided a notification within a threshold period of time of the vehicle event 128. Alternatively, or additionally, the vehicle event data can characterize an instance in which the user 102 viewed certain content at the application interface 116, such as a threshold quantity of characters, a threshold quantity of words, and/or text with certain properties (e.g., a threshold size, font, color, etc.). Alternatively, or additionally, the vehicle event data can characterize an instance in which the user 102 provided a threshold number of inputs within a threshold period of time of the vehicle event 128. Alternatively, or additionally, the vehicle event data can characterize an instance in which the user 102 activated a driving mode of an application 106 and/or computing device 104 for a period of time, but not during a separate period of time when the vehicle event 128 occurred.

In some implementations, when the vehicle event data is generated to characterize a correlation between the user 102 accessing the application interface 116 and the vehicle event 128, a selectable suggestion can be generated based on the vehicle event data. For example, the computing device 104 and/or a separate application can determine, based on application feature data, a likelihood that a user will access the application interface 116. When a metric that characterizes the likelihood or probability satisfies a threshold, a driving feature suggestion 142 can be rendered at the display interface 114. The driving feature suggestion 142 can identify one or more application driving features that the user 102 can employ in order to avoid a risk of experiencing another vehicle event 128. For example, the driving feature suggestion 142 can include natural language content characterizing an application driving feature such as an ability of the application 106 to receive spoken utterances in order to access certain information (e.g., the order information the user 102 may have been previously accessing when vehicle event 128 occurred). Alternatively, or additionally, the driving feature suggestion 142 can include a selectable element for activating an automated assistant 110 that can control the application 106 in response to spoken utterances. In this way, historical data that correlates vehicle events to application interactions can be used to render suggestions that may encourage a user to employ application driving features that can reduce a likelihood that the user 102 will experience subsequent hazardous driving events.

Figure 2A:
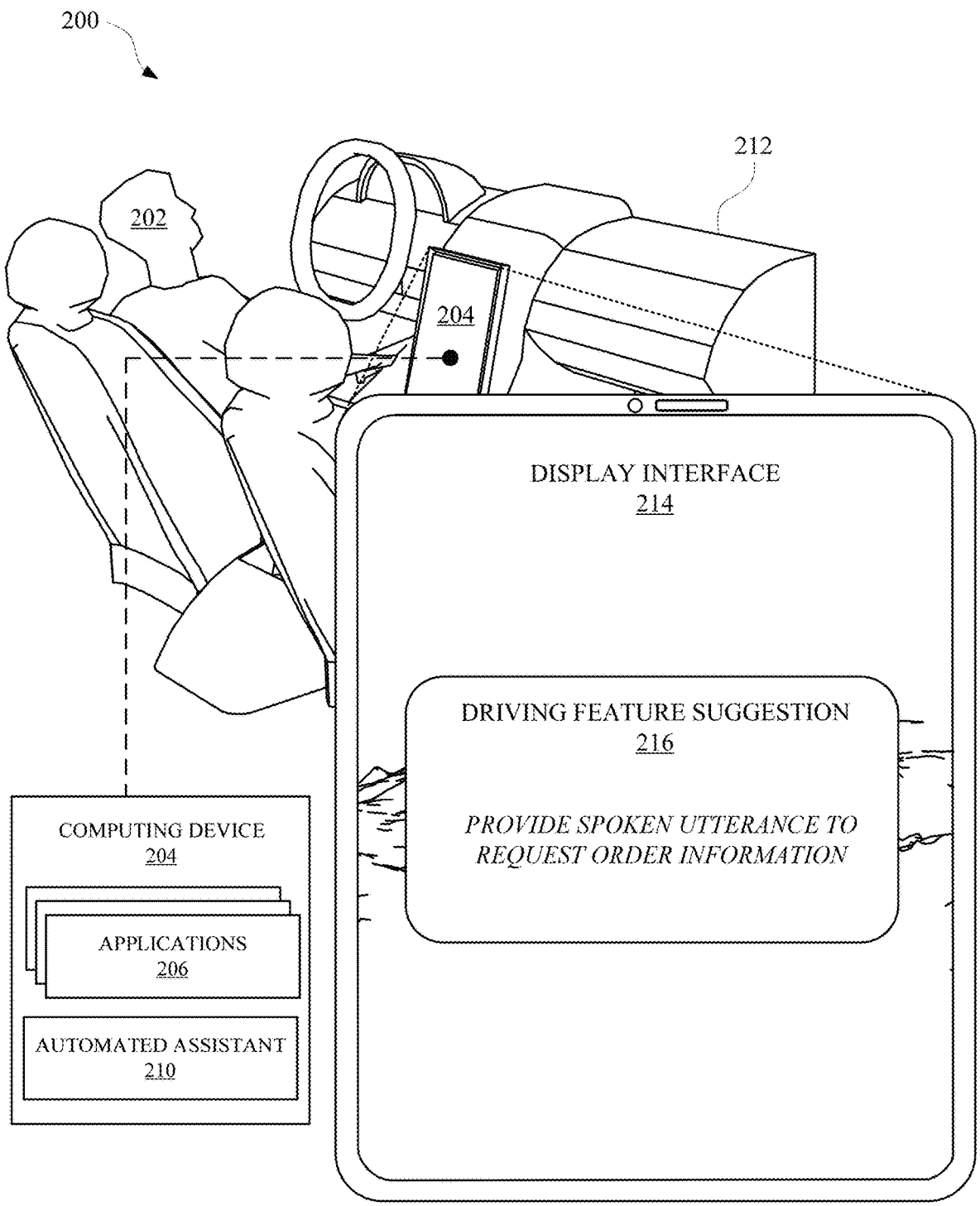
FIG. 2A and FIG. 2B illustrate views of a user interacting with an application driving feature of an application and/or computing device, and, as a result, receiving data that characterizes a reduction in hazardous vehicle events.
Figure 2B:
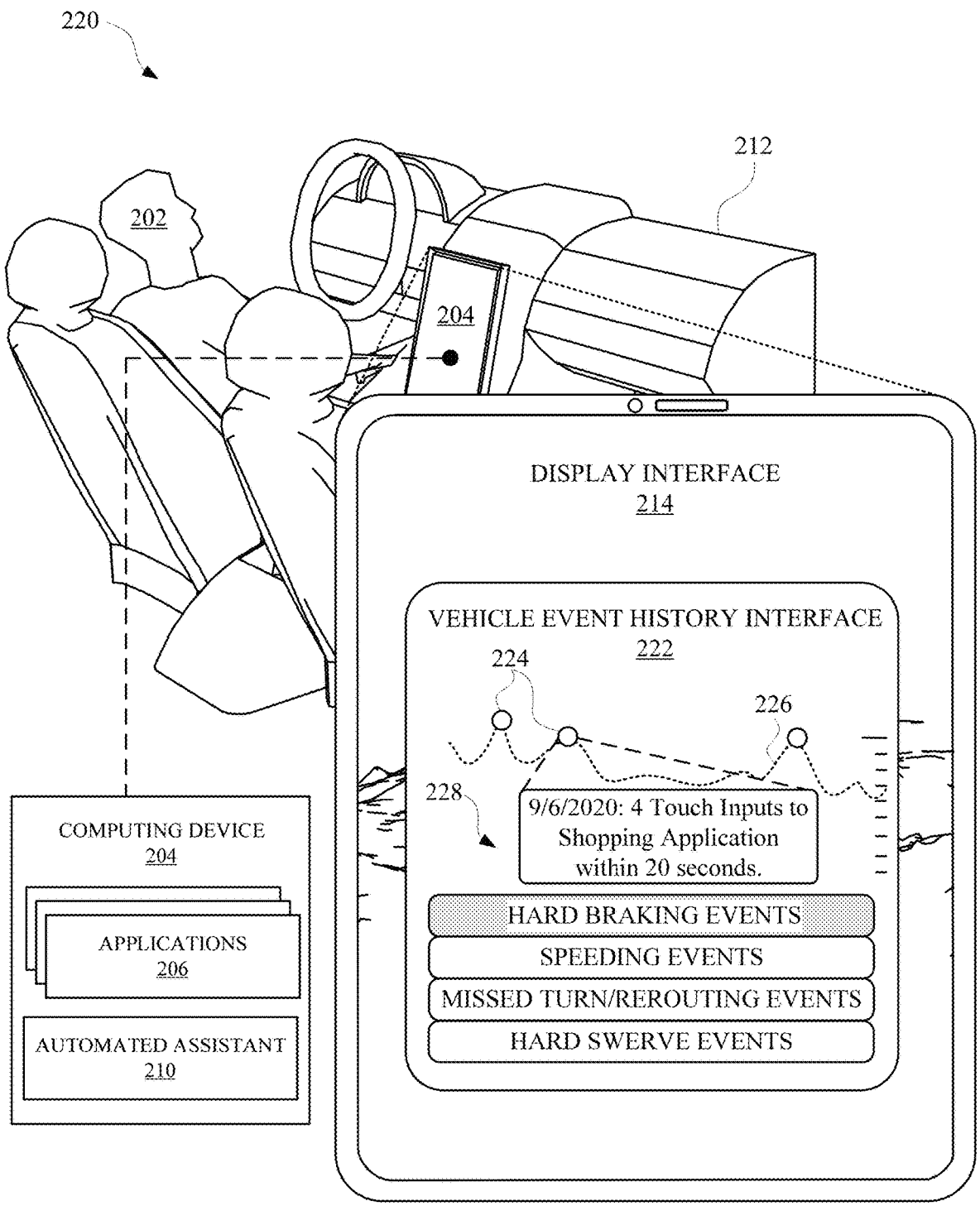

FIG. 2A and FIG. 2B illustrate a view 200 and a view 220 of a user 202 interacting with an application driving feature of an application 206 and/or computing device 204, and, as a result, receiving data that characterizes a reduction in hazardous vehicle events. The user 202 can be located in a vehicle 212 that is driving to a destination when the user accesses the application driving feature, in order to reduce a likelihood of the user 202 experiencing a hazardous driving event. A hazardous driving event can be detected via one or more sensors that are in communication with the computing device 204, thereby allowing the computing device 204 to correlate vehicle events to various application interactions. A user 202 that adopts habits of employing application driving features, which are optimized to reduce hazardous vehicle events, can then be put on notice of how their habits have affected the safety of their driving.

For example, while the user 202 is driving the vehicle 212, the user 202 may decide to operate their computing device 204 according to a driving feature suggestion 216 rendered at a display interface 214 of the computing device 204. In some implementations, the driving feature suggestion 216 can be rendered based on processing, with prior permission from the user 202, application data and/or contextual data, which can indicate that the user 202 is likely to access a particular application 206 from within their vehicle 212 at a certain time and/or location. For example, the application 206 can be the shopping application discussed with respect to FIG. 1A-FIG. 1C, and the user 202 can be the user 102. When the user 202 sees the driver feature suggestion 216, the user 202 can provide a spoken utterance 218, such as "Assistant, what's the status of my latest delivery order," instead of tapping the display interface 214 multiple times to check their order. The user 202 may therefore have adopted better habits since the vehicle event 128, which can be apparent when the user 202 elects to invoke an application driving feature in response to the driving feature suggestion 216. For example, when the user 202 invokes their automated assistant 210 to control an application 206 and/or otherwise interacts with the computing device 204 via an application driving feature, the user 202 may be avoiding a prior habit of providing touch inputs to the display interface 214 and/or attempting to read small text (e.g., text that is less than a threshold size or quantity) rendered at the display interface 214 while driving.

This change in habits can be characterized by vehicle event data, which can be generated by the computing device 204 and/or a separate computing device over time. In some implementations, the vehicle event data can be provided to the computing device 204 and/or a separate computing device for rendering. For example, a display interface 214 of the computing device 204 can render a report that characterizes a number of vehicle events that have occurred over an amount of time. In some implementations, the report can be generated periodically, in order to notify the user 202 about how certain application features may correlate to certain vehicle events. Furthermore, the report can notify the user 202 of how certain application driving features correlate to a decline in certain vehicle events.

For example, the vehicle event data can be used to generate an interface such as a vehicle event history interface 222. In some implementations, the vehicle event history interface 222 can provide one or more selectable elements 228 for the user 202 to identify via spoken utterance and/or other input in order to determine how their driving habits have changed over time. For instance, the user 202 can select "hard braking events" from the selectable elements 228 in order to see how a number of vehicle events (e.g., hard braking events, deceleration events, etc.) that the user 202 and/or vehicle 212 experienced has changed over time. In some implementations, a portion of vehicle event data can be rendered as a trend line 226 that illustrates how a number of hard braking events experienced by the user 202 and/or the vehicle 212 has declined over time. Alternatively, or additionally, the vehicle event history interface 222 can include other selectable elements 224 that, when selected, can indicate a correlation between a vehicle event (e.g., a hard braking event) and an application feature (e.g., "4 touch inputs to shopping application within 20 seconds").

In some implementations, an automated assistant 210 and/or another application can operate to notify the user 202 when certain thresholds have been reached regarding any increase or decrease in a number of vehicle events. For example, the user 202 can receive a notification from their automated assistant 210 indicating that a number of rerouting events and/or missed turn events (e.g., an event that caused a navigation application to identify a different route as a result of a missed turn) has decreased in the past month. Alternatively, or additionally, the user 202 can allow other applications and/or or entities to access their vehicle event data in order to receive benefits for their good driving behaviors. For example, vehicle event data characterizing a decline in hard swerve events can be shared with a tire application, which can provide certain benefits for users who perform less hard swerve events (e.g., fail to slow down at a curve because of a distraction). Alternatively, or additionally, vehicle event data characterizing speeding events (e.g., driving over a speed limit within a threshold amount of time of engaging with a non-driving optimized application feature and/or non-driving mode) can be shared with a health application. The health application can then provide rewards and/or incentives according to whether the number of speeding events is decreasing or increasing over time.

Figure 3:
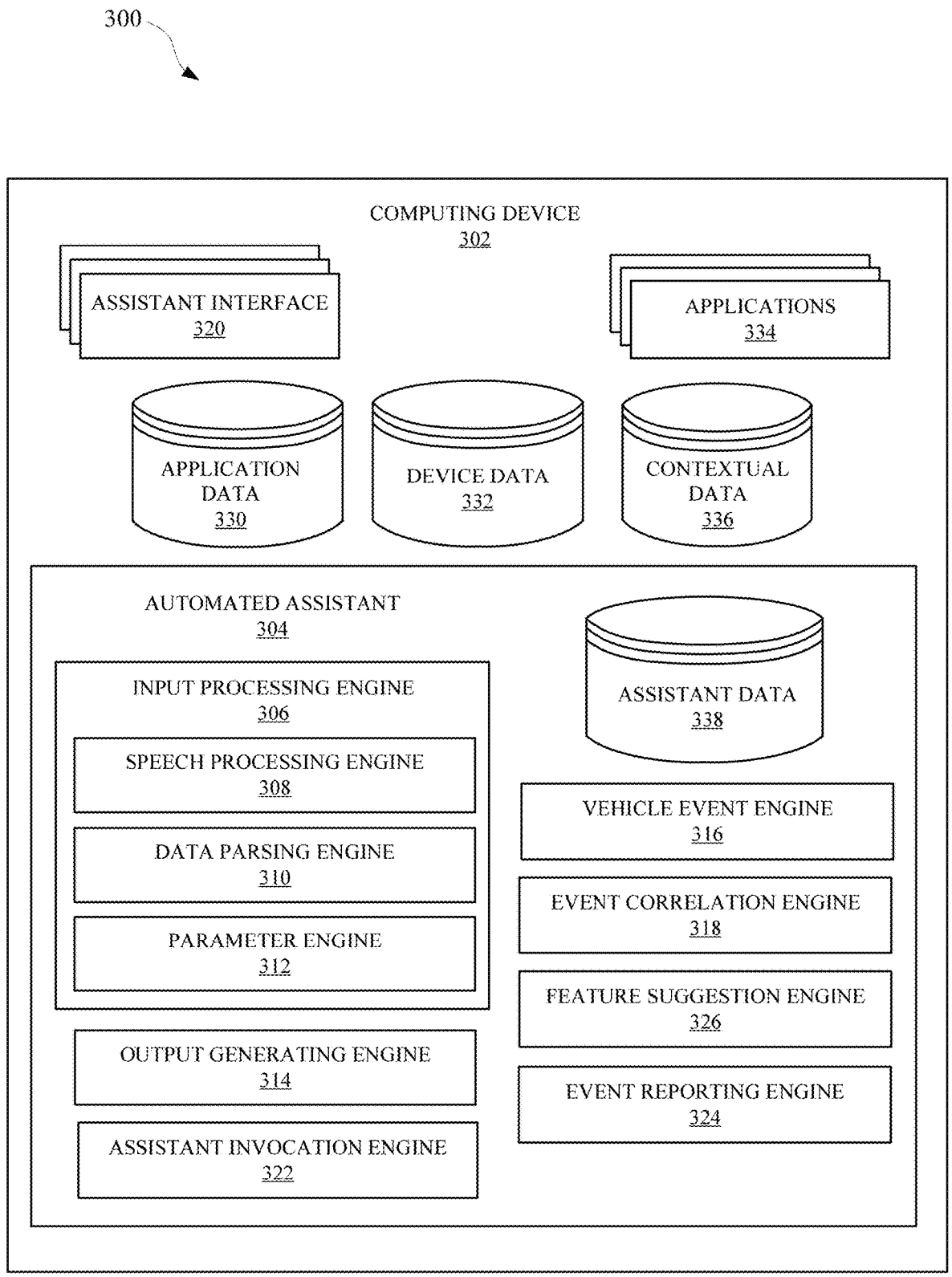
FIG. 3 illustrates a system for detecting hazardous driving events and encouraging usage of driving-optimized application features to reduce a number of hazardous driving events.

FIG. 3 illustrates a system 300 for detecting hazardous driving events and encouraging usage of driving-optimized application features to reduce a number of hazardous driving events. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include automatic speech recognition, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 and/or application feature data to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the system 300 can include a vehicle event engine 316 that can process data from the computing device 302 and/or any other device(s) in order to determine whether a vehicle has caused a vehicle event to occur. For example, the computing device 302 can include one or more sensors for detecting motion, acceleration, velocity, direction, pressure, orientation, and/or other information that can indicate a change in position of the computing device 302, a user, and/or a vehicle. Alternatively, or additionally, the vehicle event engine 316 can process application data from one or more different applications 334 in order to determine whether a vehicle event has occurred. A vehicle event can include, but is not limited to, a braking event (e.g., an amount of deceleration within period of time), a missed turn, a change in trip time, a swerving event, a collision, a mechanical vehicle issue, a cabin incident (e.g., a user spilling a drink, dropping a device while driving, etc.), and/or any other event that may be hazardous to a user and/or property.

In some implementations, the system 300 can include an event correlation engine 318 that can identify a correlation between a vehicle event identified by the vehicle event engine 316 and one or more interactions between a user and one or more applications. For example, the event correlation engine 318 can determine, based on application data 330, device data 332, and/or contextual data 336, that a particular vehicle event occurred within a threshold period of time of a user interacting with an application. Based on this correlation, the event correlation engine 318 can generate vehicle event data that can be further processed at the computing device 302 and/or provided, with prior permission from a user, to other devices. For example, an application and/or application feature that is determined to be associated with various hazardous vehicle events experienced by multiple users can be flagged by entities that design applications 334. In this way, those entities can optimize the applications that may be most correlated to hazardous vehicle events. For example, application feature(s) determined to have at least a threshold degree of correlation with hazardous vehicle events can be flagged for entities that design applications 334 to reduce their usage in applications 334. As another example, application feature(s) determined to have at least a threshold degree of correlation with hazardous vehicle events can be identified, and applications 334 can only be approved for deployment if they omit the application feature(s) and/or can only be promoted as driving-optimized if the omit the application feature(s).

In some implementations, the system 300 can include a feature suggestion engine 326 that can cause an assistant interface 320 or other interface of the computing device 302 to provide suggestions that can reduce a number of vehicle events experienced by a user. For example, the feature suggestion engine 326 can process data generated at the event correlation engine 318 in order to identify application features that are correlated to the most vehicle events. When a particular application feature is identified as correlating to a threshold number of vehicle events, the feature suggestion engine 326 can identify an application driving feature to suggest to a user. For example, when a hard braking event is determined to be correlated to a number of touch inputs provided by a user, the feature suggestion engine 326 can generate suggestion data and/or render a suggestion that identifies an automated assistant 304 as an alternative to touch inputs. Alternatively, or additionally, when a missed turn event is determined to be correlated to small textual content, the feature suggestion engine 326 can render another suggestion that identifies a spoken utterance (e.g., "Read what's on the screen.") that can be provided by the user to the computing device 302 in order to cause the automated assistant 304 to read what is on a display interface of the computing device 302. In various implementations, the feature suggestion engine 326 can determine, based on current or historical application interaction by a user and/or at a computing device (e.g., smartphone), whether to provide a suggestion and/or an extent of the suggestion. For example, a suggestion can be provided only when historical application interactions indicate the user and/or the computing device have interacted with application feature(s) that have been determined to be correlated with vehicle event(s). As another example, the feature suggestion engine 326 can provide more suggestions at a smartphone when historical application interactions indicate use, at the smartphone, of application feature(s) with a strong correlation to vehicle events. On the other hand, a lesser quantity of suggestions can be provided when the historical application interactions indicate only use of application feature(s) with a weaker correlation to vehicle events. As yet another example, the feature suggestion engine 326 can determine whether to provide suggestion(s) at a smartphone, how many suggestion(s) to provide, and/or an extent of the suggestion(s), based on a quantity of interaction(s) with certain application feature(s) at the smartphone.

In some implementations, the system 300 can include an event reporting engine 324 that can generate data for presenting a user, in order to notify a user about how their driving habits may be affecting their wellbeing. For example, the event reporting engine 324 can cause the computing device 302 to render an interface that characterizes a number of vehicle events over time. Alternatively, or additionally, the event reporting engine 324 can cause the computing device 302 to render another interface that characterizes a user of driving-optimized application features and/or non-driving optimized vehicle features over time. In this way, the user can determine whether their habits of using certain applications while driving has positively or negatively impacted a number of hazardous vehicle events experienced by the user.

Figure 4:
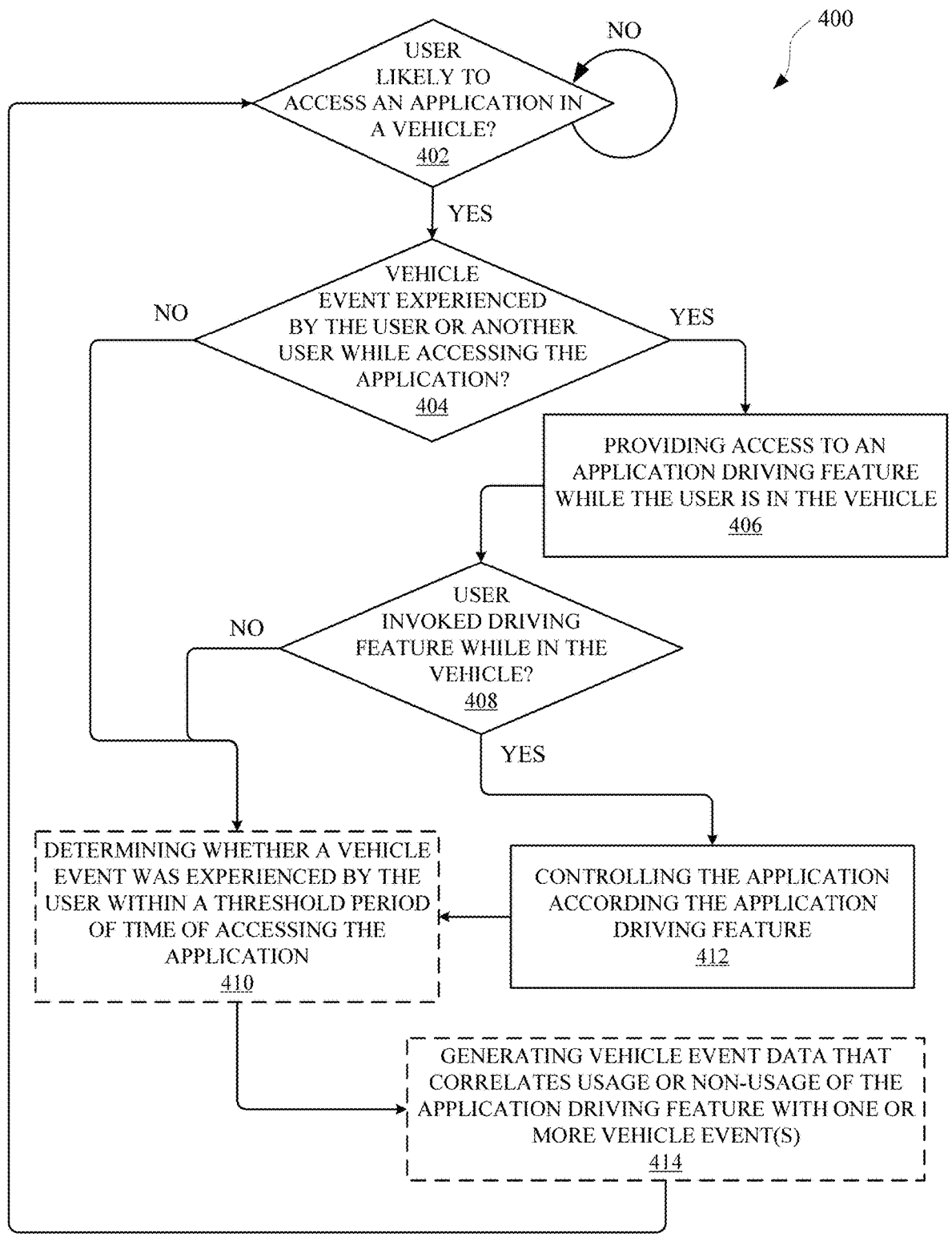
FIG. 4 illustrates a method for providing a user with access to an application driving feature based on usage of the application corresponding to one or more hazardous vehicle events.

FIG. 4 illustrates a method 400 for providing a user with access to an application driving feature based on properties of usage of the application corresponding to one or more hazardous vehicle events. The method 400 can be performed by one or more computing devices, applications, and/or any other apparatus or module that can be associated with an automated assistant.

The method 400 can include an operation 402 of determining whether a user is likely to access an application in a vehicle. This determination can be based on application data that is accessible via a personal computing device, such as a smart phone and/or a vehicle computing device. For example, application data can indicate that the user typically accesses the application within a minute of driving away from their home. Therefore, when the user is entering their vehicle that is parked in their garage at their house, the user may be more likely to access the application within minutes of entering their vehicle. When the user is determined to likely access the application, the method 400 can proceed from the operation 402 to an operation 404. Otherwise, a particular application and/or device can continue to determine whether the user is likely to access the application.

The method 400 can proceed from the operation 402 to an operation 404, which can include determining whether a vehicle event was experienced by the user or another user while accessing the application. For example, the application can be a video conferencing application that has been newly installed on a personal computing device of the user. Vehicle event data associated with the application can be accessible at the personal computing device and/or one or more other computing devices associated with one or more other users. The vehicle event data can be processed to determine whether any vehicle events have been experienced by users who were in a vehicle while accessing the application within a threshold period of time of a particular vehicle event. For example, a user can be determined to have experienced a vehicle event while accessing the application when a hazardous vehicle event was experienced by the user within a threshold period of time of the hazardous vehicle event.

In some implementations, vehicle event data can be generated using one or more computing devices and/or one or more sensors that are in communication with the one or more computing devices. For example, a computing device can include a gyro sensor and/or other accelerometer for detecting acceleration and deceleration events. The user can be determined to have experienced a vehicle event when a value for acceleration or deceleration, as detected by the gyro sensor, satisfies a threshold value. In this way, hard braking events and/or other changes in acceleration can be correlated to data that characterizes interactions between the user and one or more applications being accessed at the computing device.

When the user or another user is determined to have experienced a vehicle event while accessing the application, the method 400 can proceed from the operation 404 to an operation 406. Otherwise, the method 400 can proceed to an operation 410. The operation 406 can include providing access to an application driving feature while the user is in the vehicle. In some implementations, the user can be provided access to the application driving feature by rendering a suggestion for the user to interact with an automated assistant that can operate as an interface for the application. Alternatively, or additionally, the user can be provided access to the application driving feature by rendering a driving interface that the user can interact with in a manner that reduces the likelihood that the user experiences a hazardous vehicle event. The driving interface can be provided by the application and/or a separate application in order to encourage the user to not rely on a particular application feature that may increase the likelihood of the user experiencing a hazardous vehicle event.

The method 400 proceed from the operation 406 to an operation 408, which can include determining whether the user invoked the application driving feature while in the vehicle. If the user is determined to have invoked the application driving feature while in the vehicle, the method 400 can proceed from the operation 408 to an operation 412. Otherwise, the method 400 can proceed from the operation 408 to an operation 410. The operation 412 can include controlling the application according to the application driving feature. For example, the user can invoke an application driving feature by providing a spoken utterance to an automated assistant, in order to cause the automated assistant to control the application. Alternatively, the user can invoke an application driving feature by providing a spoken utterance to the application, or a separate application, instead of providing a direct input to a touch interface of the application. As a result, the application can be controlled according to the spoken utterance, thereby limiting a need for the user to give their full attention to a graphical interface of the application.

The method 400 can proceed from an operation 412 to an optional operation 410, which can include determining whether a vehicle event was experienced by the user within a threshold period of time of accessing the application. A vehicle event can be, but is not limited to, a hard braking event, a swerving event, a vehicle collision event, and/or any other hazardous event that can be associated with a vehicle. For example, the user may have accessed the application but not the application driving feature within a threshold period of time of a hard braking event. Alternatively, the user may have accessed the application driving feature but may have not experienced a vehicle event. The method 400 can proceed to an optional operation 414 of generating vehicle event data that correlates usage or non-usage of the application driving feature with one or more vehicle events. For example, the vehicle event data can indicate a number of times that a vehicle event occurred within a threshold period of time of the user accessing the application. Alternatively, or additionally, the vehicle event data can include a metric that characterizes a reduction in vehicle events as a result of the user employing the application driving feature.

Figure 5:
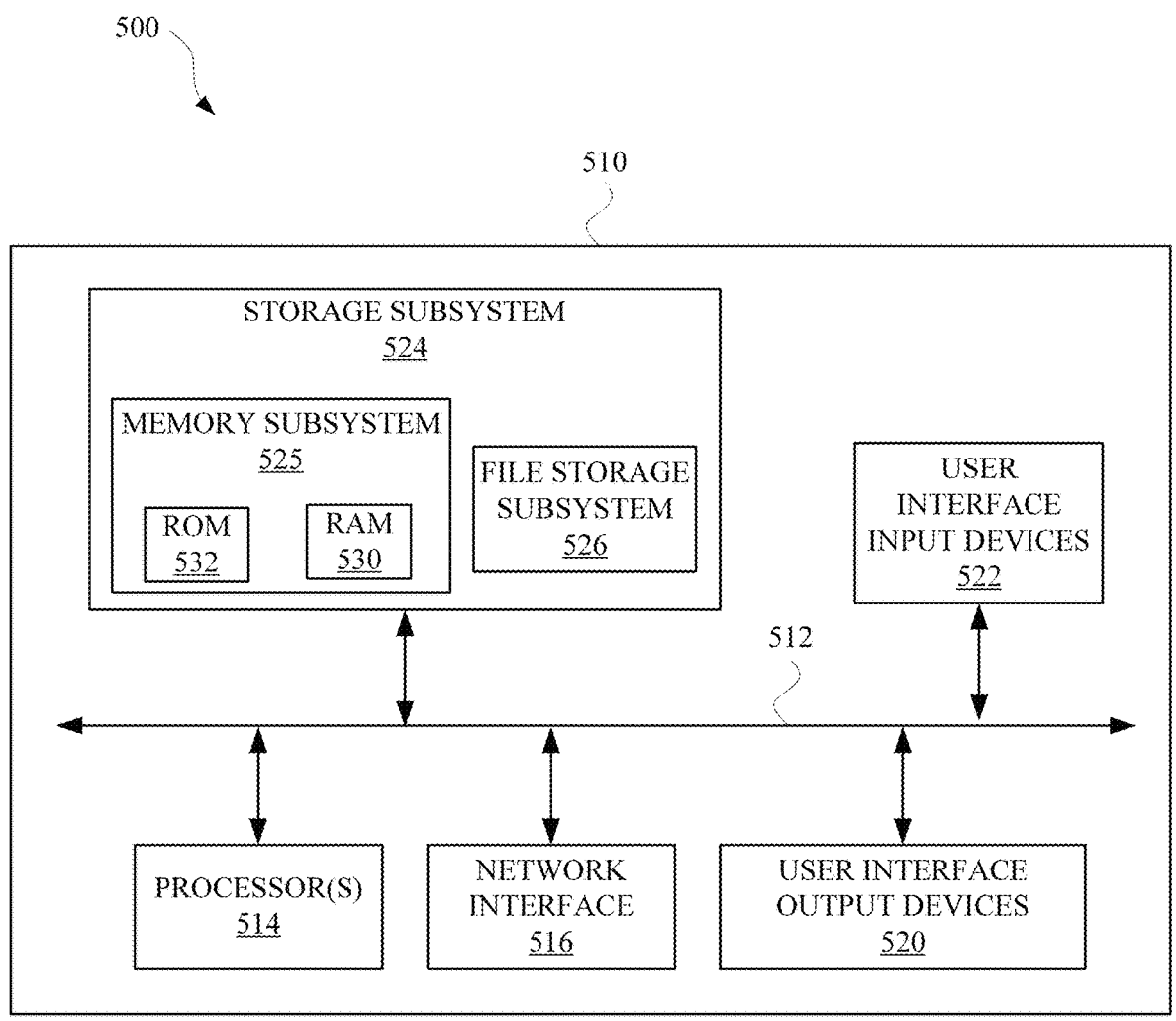
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 204, automated assistant, vehicle computing device, server device, and/or any other application, device, apparatus, and/or module discussed herein.

These software modules are generally executed by processor 514 alone or in combination with other processors.

Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set for as including operations such as processing application data that indicates a user is predicted to access an application feature of an application, wherein the application is accessible by the user via a computing device that is located within a vehicle that is driving to a destination. The method can further include an operation of processing vehicle event data that identifies one or more vehicle events experienced by the user or one or more other users while the user or the one or more other user were located within a corresponding vehicle. The method can further include an operation of determining, based on the vehicle event data and the application data, whether usage of the application feature has at least a threshold degree of correlation with the vehicle event. The method can further include an operation of, when the application feature is determined to be associated with the vehicle event: causing the computing device to provide, while the user is located within the vehicle, access to an application driving feature to mitigate experiencing of the vehicle event.

In some implementations, the method can further include an operation of determining that the user accessed the application driving feature while the user is located within the vehicle and driving toward the destination. In some implementations, the method can further include an operation of causing the computing device or a separate computing device to render an interface that indicates the correlation between usage of the application driving feature and the at least one vehicle event. In some implementations, the method can further include an operation of determining that the user accessed the application feature while the user is located within the vehicle and is driving toward the destination. In some implementations, the method can further include an operation of causing the computing device or a separate computing device to render an interface that identifies a quantity of the vehicle events that were experienced by the user and that are correlated with usage of the application feature.

In some implementations, the vehicle events quantified by the number of vehicle events include braking events that occurred within a threshold amount of time of the user accessing the application feature of the application. In some implementations, causing the computing device to provide access to the application driving feature while the user is located within the vehicle comprises: causing the computing device or a separate computing device to render a selectable suggestion that characterizes a different route for the vehicle to arrive at the destination. In some implementations, the method can further include an operation of, when the application feature is determined to have the threshold degree of correlation with the vehicle events: causing the computing device or a separate computing device to render vehicle event data that characterizes a causal relationship between the vehicle event and the application feature. In some implementations, the vehicle event data is rendered at an interface that is integral to a vehicle computing device of the vehicle. In some implementations, the method can further include an operation of, when the application feature is determined to the threshold degree of correlation with the vehicle events: causing the computing device or a separate computing device to render the vehicle event data, and wherein the vehicle event data is based on multiple prior instances in which the vehicle events were experienced by the user while the user was accessing the application feature.

In other implementations, a method implemented by one or more processors is set forth as including operations such as determining, by a computing device, that a user is located in a vehicle that is operating in furtherance of arriving at a destination. The method can further include an operation of determining, by the computing device and based on application data, that the user is interacting with an application. The method can further include an operation of processing sensor data in furtherance of determining whether a vehicle event has occurred, or is expected to occur, with a threshold amount of time of the accessing a feature of the application. The method can further include an operation of, when, based on the sensor data and the application data, the user is determined to have accessed the feature of the application within the threshold amount of time of the vehicle event: generating vehicle event data that characterizes the vehicle event as occurring within the threshold amount of time of the user accessing the feature of the application. The method can further include an operation of causing an interface of the computing device or a separate computing device to render the vehicle event data.

In some implementations, the vehicle event is a deceleration event and the sensor data is based on one or more sensors of the computing device. In some implementations, determining that the user is accessing the feature of the application includes: determining that the user is accessing, at the application, a graphical interface that includes natural language content of less than a threshold size. In some implementations, determining that the user is accessing the feature of the application includes: determining that the user is interacting with a graphical interface of the computing device to provide an input to the application, and that the user provided a threshold quantity of inputs to the application within the threshold period of time. In some implementations, the method can further include an operation of, when the user is determined to not have accessed the feature of the application within the threshold period of time of the vehicle event: generating other vehicle event data that characterizes the vehicle event as not occurring within the threshold amount of time of the user accessing the feature of the application.

In yet other implementations, a method implemented by one or more processors is set forth as including operations such as accessing vehicle event data that characterizes one or more vehicle events that were experienced by one or more other users. The method can further include an operation of determining, based on the vehicle event data, that the one or more vehicle events occurred while the one or more other users were accessing instances of an application operating in a non-driving mode. The method can further include an operation of generating, based on the vehicle event data, suggestion data that identifies an application driving feature for a user to access to avoid experiencing the one or more vehicle events while interacting with the application from within a vehicle, wherein the application driving feature is accessible via the application or another application. The method can further include an operation of causing, based on the suggestion data, an interface of a computing device to render a selectable suggestion that, when selected by the user, causes the application driving feature to be accessible to the user.

In some implementations, the method can further include an operation of identifying, based on the vehicle event data, the application driving feature from one or more different application driving features, wherein the application driving feature is identified further based on a type of vehicle event that corresponds to the one or more vehicle events. In some implementations, the type of vehicle event is a vehicle collision event and the application driving feature is a spoken command feature of an automated assistant application that is separate from the application, and the automated assistant application communicates with the application in response to a spoken utterance from the user to the automated assistant application. In some implementations, the method can further include an operation of accessing application feature data that characterizes one or more application features accessible via the application. In some implementations, the method can further include an operation of determining, based on the application feature data and the vehicle event data, whether the user is accessing a particular application feature, of the one or more application features, that the one or more other users were accessing when the one or more vehicle events occurred.

In some implementations, causing the computing device to render the selectable suggestion is performed in response to determining that the user is accessing the particular application feature. In some implementations, the method can further include an operation of accessing application feature data that indicates one or more properties of usage, by the user, of a particular application feature of the application. In some implementations, the method can further include an operation of determining whether the one or more properties of usage satisfy one or more thresholds for rendering the selectable suggestion, wherein causing the computing device to render the selectable suggestion is performed in response to determining that the one or more properties of usage satisfy the one or more thresholds. In some implementations, the one or more properties of usage include an amount of time that the user has spent accessing the particular application feature.

We claim:
1. A method implemented by one or more processors, the method comprising:
  determining, based on processing sensor data generated by one or more sensors, that multiple vehicle events have occurred while a user is travelling in a vehicle, the multiple vehicle events including multiple first events of a first category of vehicle events and multiple second events of a second category of vehicle events;
  generating, based on processing the sensor data, vehicle event history data that characterizes each of the multiple vehicle events as occurring while the user is travelling in the vehicle;
  causing, at an interface of a computing device and based on the vehicle event history data, rendering of multiple selectable elements including a first selectable element corresponding to the first category of vehicle events and a second selectable element corresponding to the second category of vehicle events;
  in response to selection of the first selectable element corresponding to the first category of vehicle events:
    causing rendering of one or more first indications, of a correlation between the multiple first events of the first category of vehicle events and one or more application features, independent of rendering of any indication of the multiple second events of the second category of vehicle events; and in response to selection of the second selectable element corresponding to the second category of vehicle events:
  causing rendering of one or more second indications, of an additional correlation between the multiple second events of the second category of vehicle events and one or more of the application features, independent of rendering of any indication of the multiple first events of the first category of vehicle events.

2. The method of claim 1, wherein the one or more sensors are of the computing device.

3. The method of claim 1, wherein the one or more sensors are of a separate computing device in communication with the computing device.

4. The method of claim 1, wherein processing the sensor data is in response to determining whether a vehicle event has occurred, or is expected to occur, within a threshold amount of time of the user accessing a feature of an application on the computing device while the user is travelling.

5. The method of claim 1, wherein determining that the multiple vehicle events have occurred while the user is travelling in the vehicle is further based on processing application data indicating that the user interacted with an application via the interface and/or another interface of the computing device within a threshold amount of time of the multiple events.

6. The method of claim 1, wherein the multiple first events correspond with the user dropping an object while driving.

7. The method of claim 1, wherein the multiple first events correspond with deceleration exceeding a threshold amount of deceleration within a period of time.

8. The method of claim 1, wherein the multiple first events correspond with a missed turn.

9. The method of claim 1, wherein the multiple first events correspond with a mechanical vehicle issue.

10. The method of claim 1, wherein causing the rendering of multiple selectable elements including the first selectable element corresponding to the first category of vehicle events and the second selectable element corresponding to the second category of vehicle events comprises graphically rendering a trend illustrating occurrence of the multiple selectable elements over a period of time.

11. A system comprising:
  one or more computers comprising one or more processors, and one or more storage devices storing instructions that are operable, when executed by the one or more computers, to cause the one or more computers to perform operations comprising:
    determining, based on processing sensor data generated by one or more sensors, that multiple vehicle events have occurred while a user is travelling in a vehicle, the multiple vehicle events including multiple first events of a first category of vehicle events and multiple second events of a second category of vehicle events;
    generating, based on processing the sensor data, vehicle event history data that characterizes each of the multiple vehicle events as occurring while the user is travelling in the vehicle;
    causing, at an interface of a computing device and based on the vehicle event history data, rendering of multiple selectable elements including a first selectable element corresponding to the first category of vehicle events and a second selectable element corresponding to the second category of vehicle events;
    in response to selection of the first selectable element corresponding to the first category of vehicle events:
      causing rendering of one or more first indications, for each of a correlation between the one or more multiple first events of the first category of vehicle events and one or more application features, independent of rendering of any indication of the multiple second events of the second category of vehicle events; and
    in response to selection of the second selectable element corresponding to the second category of vehicle events:
      causing rendering of one or more second indications, for each of an additional correlation between the multiple second events of the second category of vehicle events and one or more of the application features, independent of rendering of any indication of the multiple first events of the first category of vehicle events.

12. The system of claim 11, wherein the one or more sensors are of the one or more computers.

13. The system of claim 11, wherein the one or more sensors are of a separate computing device in communication with the one or more computers.

14. The system of claim 11, wherein processing the sensor data is in response to determining whether a vehicle event has occurred, or is expected to occur, within a threshold amount of time of the user accessing a feature of an application on the computing device while the user is travelling.

15. The system of claim 11, wherein determining that the multiple vehicle events have occurred while the user is travelling in the vehicle is further based on processing application data indicating that the user interacted with an application via the interface and/or another interface of the computing device within a threshold amount of time of the multiple events.

16. The system of claim 11, wherein the multiple first events correspond with the user dropping an object while driving.

17. The system of claim 11, wherein the multiple first events correspond with deceleration exceeding a threshold amount of deceleration within a period of time.

18. The system of claim 11, wherein the multiple first events correspond with a missed turn.

19. The system of claim 11, wherein the multiple first events correspond with a mechanical vehicle issue.

20. The system of claim 11, wherein causing the rendering of multiple selectable elements including the first selectable element corresponding to the first category of vehicle events and the second selectable element corresponding to the second category of vehicle events comprises graphically rendering a trend illustrating occurrence of the multiple selectable elements over a period of time.

* * * * *